L. Baker,
Shoemakers' Tool.
Nº 1,752.  Patented Sep. 2, 1840.
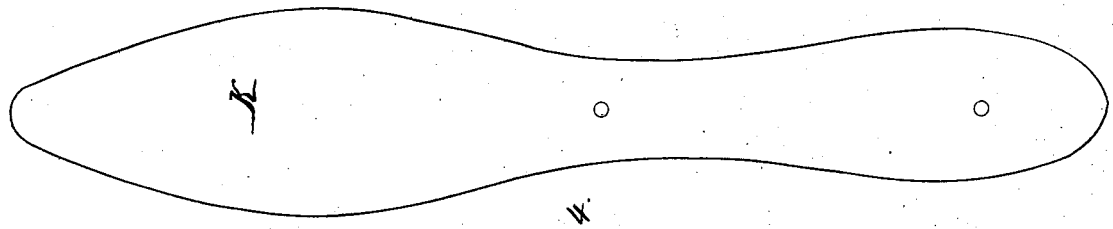
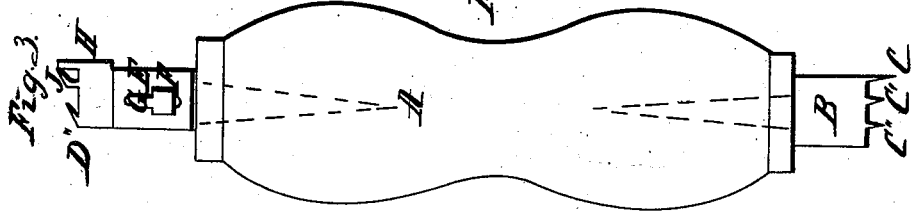
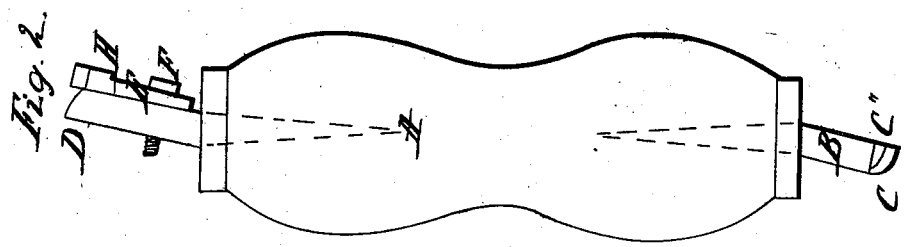
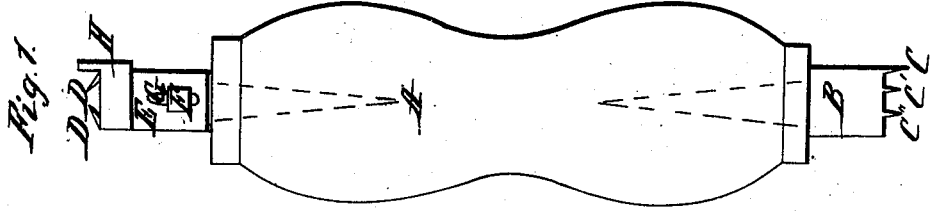

UNITED STATES PATENT OFFICE.

LEWIS BAKER, OF FORT PLAIN, NEW YORK.

MODE OF CHANNELING AND SCARFING THE SOLES OF PUMPS, SHOES, &c.

Specification of Letters Patent No. 1,752, dated September 2, 1840.

*To all whom it may concern:*

Be it known that I, LEWIS BAKER, of Fort Plain, Montgomery county, State of New York, have invented a new and useful Instrument for Channeling and Scarfing the Soles of Pumps, &c., called "Baker's Pump-Fitter," which is described as follows, reference being had to the annexed drawings of the same, making part of this specification.

Figure 1 is a front view of the instrument for channeling. Fig. 2 is a side view of ditto. Fig. 3 is a front view of the instrument as adapted to scarfing the outer edge of the sole; Fig. 4, the pattern or form used with the instruments.

Similar letters refer to similar parts in the figures.

The before mentioned instrument consists of a round handle A turned to fit the hand about five inches long, one inch diameter, at the thickest part, and three-quarters of an inch diameter in the middle, and banded at each end. The instruments for cutting are inserted into the ends of the handle.

The cutters C, C', C'', for taking off the outer edge of the sole and making two vertical parallel cuts half through the sole preparatory to cutting away the strips at the sides thereof so as to leave the center piece or that which comes between the cutters C' C'' in the form of a tongue, is made in the following manner. It consists of a stock or piece of metal B with a tapered shank at one end which is inserted into the handle and three parallel cutters C C' C'' at the other end. The outer cutter C is made longer than the others and long enough to cut through the sole; the two other cutters C' C'' are about half the length of the outer cutter and as far apart as the width of the required tongue to be formed and all of them are rounded on the cutting edges. The cutters D D' for taking away the leather at the sides of the aforesaid parallel cuts are made in the following manner. The stock and shank are made like the shank and stock of the cutters just described and the shank is inserted in the other end of the handle in a similar manner. The cutters D D' however instead of being made vertical at the end of the stock are made oblique and are formed on the ends of two pieces of metal which are brazed or otherwise secured to the sides of the stock. The edges of the cutters D incline toward each other in such manner that as the instrument is performing its office they shall take out two parallel strips of leather of a triangular shape from the sides of the aforesaid parallel cuts, the points of said cutters reaching the bottoms of the said cuts and thus leaving a middle strip between them in the form of a tongue to which the upper of the pump is to be sewed. The front or cutting edges are made round and sharp. The backs are straight and blunt. On the stock is placed a gage E for preventing the cutters entering too deep into the leather. This gage is the same width as the stock to which it is secured by a screw F over the shank of which the gage may be moved in setting it—being perforated with an oblong slot G for that purpose. This gage extends in length down to the angles of the oblique cutters D D'.

A lip H is formed on the edge of the gage in length equal to the thickness of the sole designed to touch upon the lap board in cutting. The gage rests upuon the upper surface of the sole.

The instrument used for making a channel on the inner side of the tongue and scarfing the outer edge of the sole is made similar to the instrument just described except so far as relates to the cutter next the lip $H^2$ of the gage which is the outer or scarfing cutter. This cutter is marked I and is turned outward (instead of inward) toward the outer edge of the sole and its angle is set lower than the angle of the inner cutter so as to be at the bottom of one of the parallel cuts first made by the cutters C' C'' while its cutting edge will pass along the edge of the sole next the cutting board and will thus scarf the outer edge of the sole down to a feather edge. The vertical part of this cutter which is next the stock will be made sharp so that it may cut one of the vertical cuts or pass along in the cut previously made by the cutter C'.

The pattern K used with the before described cutters is made of cast iron the figure of the sole upon which it is laid but of smaller dimensions having three perforations for the insertion of tacks which pass through the pattern and sole into the cutting board and hold it securely thereon. After the sole is blocked out and in a moist state, or situation for being worked and after it has been properly scarfed with a shoe knife, and sufficiently hammered place it on the lap board—flesh side up—then place the pattern upon the sole and tack it down firmly, grasp the cutting instrument in the right hand—the parallel cutters downward and move it around against the edge of the form or pattern—the stock rubbing against the edges of the form or pattern and bear sufficiently hard upon the instrument to cause the cutters to enter the leather which operation will take off the outer edge of the sole and make two parallel cuts half through. Then reverse the position of the instrument and apply the oblique cutters in a similar manner which will take out two triangular strips at the sides of the part between the two parallel cuts which will be left uncut in the form of a tongue to which the edges of the upper are to be sewed—the gage touching the top of the sole and the lip the upper surface of the cutting board which will prevent the cutters entering too deep into the leather. The cutter for scarfing or making a thin edge is applied in a similar manner.

What I claim as my invention and which I desire to secure by Letters Patent consists in—

The combination of the cutting instruments with the form as before described.

LEWIS BAKER.

Witnesses:
 MALVINA BAKER,
 LUCY W. BAKER.